US010612118B2

(12) United States Patent
Machado Amorim et al.

(10) Patent No.: US 10,612,118 B2
(45) Date of Patent: Apr. 7, 2020

(54) METHODS FOR PRODUCING A PRE-LACQUERED METAL SHEET HAVING ZN—AL—MG COATINGS AND CORRESPONDING METAL SHEET

(71) Applicant: ARCELORMITTAL INVESTIGACIÓN Y DESARROLLO, S.L., Sestao, Bizkaia (ES)

(72) Inventors: Tiago Machado Amorim, Metz (FR); Joëlle Richard, Chantilly (FR); Eric Jacqueson, Longeville les Metz (FR); Audrey Lhermeroult, Metz (FR); Pascale Feltin, Saint Privat la Montagne (FR); Jean-Michel Lemaire, Villers Saint Paul (FR); Christian Allely, Metz (FR); Luc Diez, Metz (FR); Jean-Michel Mataigne, Senlis (FR)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 15/052,365

(22) Filed: Feb. 24, 2016

(65) Prior Publication Data

US 2016/0168683 A1 Jun. 16, 2016

Related U.S. Application Data

(62) Division of application No. 14/397,093, filed as application No. PCT/IB2013/053279 on Apr. 25, 2013.

(30) Foreign Application Priority Data

Apr. 25, 2012 (WO) .................. PCT/FR2012/050910

(51) Int. Cl.
*C23C 2/06* (2006.01)
*C23C 22/82* (2006.01)
(Continued)

(52) U.S. Cl.
CPC .............. *C23C 2/06* (2013.01); *B32B 15/013* (2013.01); *C22C 18/00* (2013.01); *C22C 18/04* (2013.01);
(Continued)

(58) Field of Classification Search
CPC .............. C23C 2/06; C23C 18/00; B05D 7/14
See application file for complete search history.

(56) References Cited

U.S. PATENT DOCUMENTS 4,101,345 A * 7/1978 Hunter ...................... C23C 2/02
148/253
5,436,081 A 7/1995 Ueda et al.
(Continued)

FOREIGN PATENT DOCUMENTS

CA 2374539 A1 11/2000
CN 1612947 A 9/2007
(Continued)

OTHER PUBLICATIONS

USS (https://www.ussteel.com/technical-bulletins/hot-dip-galvanized-application-considerations, Retrieved Aug. 11, 2017, Posted Oct. 1, 2002, Extra Smooth Galvanized Sheet, pp. 1-12).*
(Continued)

*Primary Examiner* — Francisco W Tschen
(74) *Attorney, Agent, or Firm* — Davidson, Davidson & Kappel, LLC

(57) ABSTRACT

A method is provided. The method includes providing a steel substrate having two faces coated by dipping the substrate in a bath, altering layers of magnesium oxide or magnesium hydroxide formed on the outer surfaces of the metal coatings
(Continued)

by applying mechanical forces, rinsing and drying the outer surfaces, applying a conversion solution on the outer surfaces and painting the outer surfaces of the metal coatings. A metal sheet is also provided.

16 Claims, 1 Drawing Sheet

(51) Int. Cl.
  *C22C 18/00* (2006.01)
  *C23C 28/02* (2006.01)
  *B05D 7/14* (2006.01)
  *C23C 22/78* (2006.01)
  *C23C 28/00* (2006.01)
  *C22C 18/04* (2006.01)
  *C23C 2/26* (2006.01)
  *C23C 2/28* (2006.01)
  *C23G 1/10* (2006.01)
  *B32B 15/01* (2006.01)
  *C23C 22/06* (2006.01)

(52) U.S. Cl.
  CPC .......... *C23C 2/26* (2013.01); *C23C 2/28* (2013.01); *C23C 22/06* (2013.01); *C23C 22/78* (2013.01); *C23C 22/82* (2013.01); *C23C 28/00* (2013.01); *C23C 28/021* (2013.01); *C23G 1/10* (2013.01); *B05D 7/14* (2013.01); *B05D 2252/10* (2013.01); *B05D 2350/65* (2013.01); *Y10T 428/12542* (2015.01)

(56) References Cited

U.S. PATENT DOCUMENTS

| | | | |
|---|---|---|---|
| 6,465,114 | B1 | 10/2002 | Honda et al. |
| 6,773,516 | B2* | 8/2004 | Hardin ............... C23C 22/53 106/14.21 |
| 7,534,312 | B2 | 5/2009 | Naoki et al. |
| 7,534,502 | B2 | 5/2009 | Honda et al. |
| 7,709,058 | B2 | 5/2010 | Kunz et al. |
| 8,293,334 | B2 | 10/2012 | Hackbarth et al. |
| 8,697,252 | B2 | 4/2014 | Hiroshi et al. |
| 2003/0000846 | A1 | 1/2003 | Rzeznik |
| 2003/0148136 | A1 | 8/2003 | Yamamoto |
| 2003/0175547 | A1* | 9/2003 | Carey, II ............... C23C 2/06 428/648 |
| 2004/0166360 | A1 | 8/2004 | Imai |
| 2004/0238081 | A1 | 12/2004 | Yoshinaga |
| 2004/0244875 | A1 | 12/2004 | Mitsuhiro et al. |
| 2006/0130936 | A1 | 6/2006 | Mawston et al. |
| 2008/0026233 | A1 | 1/2008 | Kunz et al. |
| 2008/0197020 | A1 | 8/2008 | Witteler et al. |
| 2009/0297881 | A1 | 12/2009 | Maalman |
| 2010/0040906 | A1 | 2/2010 | Irie |
| 2011/0008644 | A1 | 1/2011 | Naritomi et al. |

FOREIGN PATENT DOCUMENTS

| | | |
|---|---|---|
| DE | 19923084 A | 11/2000 |
| DE | 102005005858 A1 | 8/2006 |
| EP | 1199376 A1 | 4/2002 |
| EP | 1466994 A1 | 10/2004 |
| JP | 2001348678 A | 12/2001 |
| JP | 2002-241962 A | 8/2002 |
| JP | 2002317257 A | 10/2002 |
| JP | 2002317257 A | 10/2002 |
| JP | 2003013192 A | 1/2003 |
| JP | 3600804 B2 | 12/2004 |
| JP | 2006022363 A | 1/2006 |
| JP | 2006062214 A | 3/2006 |
| JP | 2006152436 A | 6/2006 |
| JP | 200700228 A | 1/2007 |
| JP | 2007131906 A | 5/2007 |
| JP | 2011206646 A | 10/2011 |
| JP | 4969831 B2 | 7/2012 |
| RU | 2417273 C2 | 4/2011 |
| WO | 0218065 A2 | 3/2002 |
| WO | 2008135478 A2 | 11/2008 |
| WO | 0171058 A1 | 9/2011 |

OTHER PUBLICATIONS

English Abstract of JP2003013192, Dec. 15, 2004.
English Abstract of JP2006152436, Jul. 4, 2012.
English Abstract of JP2001348678, Dec. 18, 2001.
English Abstract of JP2002317257, Oct. 31, 2002.
English Abstract of JP2006062214, Mar. 3, 2006.
"Charakteristische Merkmale 095 Schmelztauchveredeltes Band and Blech", Stahl-Informations Zentrum, 2010, see English version "Continuously Hot-Dip Coated Steel Strip and Sheet".
"Zink-Magnesium-veredelte Feinbleche", Stahl-Informations-Zentrum, 2012, see English version "Zinc-Magnesium Coated Steel Sheets".
"Organisch bandbeschichtete Flacherzeugnisse aus Stahl", Veroffentlichung des Stahl-Informations-Zentrums, Charakteristische Merkmale 093, 2012, see English version "Continuously Organic Coated Steel Flat Products".
Technical Data Sheet "Bonderite 1455 Bonderite 1455-W Wipes", Nov. 2012, See English version "Bonderite 1455-W Wipes".
Pladur EG-Sicherheitsdatenblatt "Pladur—Basis Feinblech chemisch passiviert" dated Oct. 2, 2008, Materialnummer TKS-185, see English translation.
Sicherheitsdatenblatt, Granodine 1456, Sicherheitsdatenblatt gemäss (EG) Nr. 1907/2006—ISO 11014-1, Granodine 1456, Jul. 2008, see machine translation and also English translation of earlier version of Granodine 1456 data sheet (Dec. 2003).
"Stahlband and seine Oberflaechenveredlung", speech given purpotedly in Mar./Apr. 2000, last downloaded from the internet at http://www.tis-gdv.de/tis/tagungen/svt/svt00/neba1/neba1.htm on Sep. 17, 2019, see partial English translation.

* cited by examiner

METHODS FOR PRODUCING A PRE-LACQUERED METAL SHEET HAVING ZN—AL—MG COATINGS AND CORRESPONDING METAL SHEET This is a divisional of U.S. application Ser. No. 14/397,093 filed on Oct. 24, 2014, the entire disclosure of which is hereby incorporated by reference herein.

The present invention relates to a metal sheet comprising a steel substrate having two faces each coated with a metal coating comprising zinc, magnesium and aluminum and a paint film.

BACKGROUND

Such metal sheets are commonly referred to as "pre-lacquered" and are for example intended for the household appliance field or construction.

The entire method for producing such metal sheets being performed by the steelworker, the costs and constraints related to painting for users are decreased.

The metal coatings, essentially comprising zinc and aluminum in small proportions (typically approximately 0.1 wt %), are traditionally used for good corrosion protection. These metal coatings are currently subject to competition in particular from coatings comprising zinc, magnesium and aluminum.

Such metal coatings will be globally referred to hereinafter as zinc-aluminum-magnesium or ZnAlMg coatings.

Adding magnesium significantly increases the resistance of these coatings to corrosion, which may make it possible to reduce their thickness or increase the corrosion protection guarantee over time.

SUMMARY OF THE INVENTION

An object of the present invention is to provide a method that makes it possible to produce pre-lacquered metal sheets with ZnAlMg coatings, those metal sheets having a still further increased corrosion resistance.

The present invention first provides a method for producing a metal sheet. The method includes providing a steel substrate having two faces each coated with a metal coating obtained by dipping the substrate in a bath and cooling, each metal coating comprising zinc, between 0.1 and 20 wt % of aluminum, and between 0.1 and 10 wt % of magnesium, the substrate thus coated having been subjected to a skin-pass step, degreasing the outer surfaces of the metal coatings, rinsing and drying the outer surfaces of the metal coatings, altering layers of magnesium oxide or magnesium hydroxide formed on the outer surfaces of the metal coatings, said alteration step comprising the application of an acid solution on the outer surfaces of the metal coatings, rinsing and optionally drying the outer surfaces of the metal coatings, applying a conversion solution on the outer surfaces of the metal coatings, drying the outer surfaces of the metal coatings, and painting the outer surfaces of the metal coatings to cover each of them with a paint film comprising at least one polymer chosen from the group consisting of melamine-cross-linking polyesters, isocyanate-cross-linking polyesters, polyurethanes and halogenated derivatives of vinyl polymers, excluding cataphoretic paints.

The present invention provides another method for producing a metal sheet. The method includes providing a steel substrate having two faces each coated with a metal coating obtained by dipping the substrate in a bath and cooling, each metal coating comprising zinc, between 0.1 and 20 wt % of aluminum, and between 0.1 and 10 wt % of magnesium, the substrate thus coated having been subjected to a skin-pass step, degreasing the outer surfaces of the metal coatings, rinsing and drying the outer surfaces of the metal coatings, applying an acid conversion solution not containing chromium on the outer surfaces of the metal coatings, said conversion solution having a pH comprised between 1 and 2, drying the outer surfaces of the metal coatings, painting the outer surfaces of the metal coatings to cover each of them with a paint film comprising at least one polymer chosen from the group consisting of melamine-cross-linking polyesters, isocyanate-cross-linking polyesters, polyurethanes and halogenated derivatives of vinyl polymers, excluding cataphoretic paints.

The present invention provides a further method for producing a metal sheet. The further method includes providing a steel substrate having two faces each coated with a metal coating obtained by dipping the substrate in a bath and cooling, each metal coating comprising zinc, between 0.1 and 20 wt % of aluminum, and between 0.1 and 10 wt % of magnesium, the substrate thus coated having been subjected to a skin-pass step, altering layers of magnesium oxide or magnesium hydroxide formed on the outer surfaces of the metal coatings, said alteration step comprising applying mechanical forces on the outer surfaces of the metal coatings, and optionally applying an acid solution on the outer surfaces of the metal coatings, if the alteration step comprises applying an acid solution, rinsing and optionally drying the outer surfaces of the metal coatings, non-oxidizing degreasing the outer surfaces of the metal coatings, rinsing and drying the outer surfaces of the metal coatings, applying a conversion solution on the outer surfaces of the metal coatings, drying the outer surfaces of the metal coatings, painting the outer surfaces of the metal coatings to cover each of them with a paint film comprising at least one polymer chosen from the group consisting of melamine-cross-linking polyesters, isocyanate-cross-linking polyesters, polyurethanes and halogenated derivatives of vinyl polymers, excluding cataphoretic paints.

The present invention also provides a metal sheet. The metal sheet has two faces each coated with a metal coating comprising zinc, aluminum and magnesium and by a paint film comprising at least one polymer chosen from the group consisting of melamine-cross-linking polyesters, isocyanate-cross-linking polyesters, polyurethanes and halogenated derivatives of vinyl polymers, excluding cataphoretic paints. The metal coatings comprise between 0.1 and 20 wt % of aluminum and 0.1 and 10 wt % of magnesium. The metal sheet being obtained by one of the methods of the present invention.

BRIEF DESCRIPTION OF THE DRAWINGS

The present invention will now be illustrated through non-limiting examples provided for information, in reference to the appended figures, in which.

DETAILED DESCRIPTION

Figure 1:
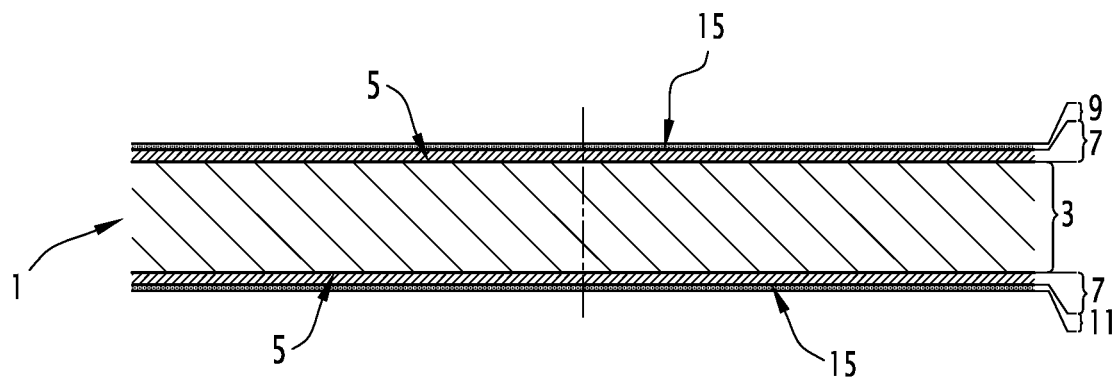
FIG. 1 is a diagrammatic cross-sectional view illustrating the structure of a metal sheet obtained using a method according to the present invention.

The metal sheet 1 of FIG. 1 comprises a steel substrate 3 covered on each of its two faces 5 by a metal coating 7. The coatings 7 are respectively covered by an upper paint film 9 and a lower paint film 11.

It will be noted that the relative thicknesses of the substrate 3 and of the various layers covering are not shown to scale in FIG. 1 in order to facilitate the illustration.

The coatings 7 present on the two faces 5 are similar and only one will be described in detail below.

The coating 7 generally has a thickness smaller than or equal to 25 μm, for example, and traditionally aims to protect the substrate 3 from corrosion.

The coating 7 comprises zinc, aluminum and magnesium. It is in particular preferred for the coating 7 to comprise, for example, between 0.1 and 10 wt % of magnesium and between 0.1 and 20 wt % of aluminum.

Also preferably, the coating 7 comprises more than 0.3 wt % of magnesium, or even between 0.3 wt % and 4 wt % of magnesium and/or between 0.5 and 11 wt % or even between 0.7 and 6 wt % of aluminum.

Preferably, the Mg/Al weight ratio between the magnesium and the aluminum in the coating 7 is less than or equal to 1, or even strictly less than 1, or even strictly less than 0.9.

The paint films 9 and 11 are for example polymer-based. Preferably, they comprise at least one polymer chosen from the group consisting of melamine-cross-linking polyesters, isocyanate-cross-linking polyesters, polyurethanes and halogenated derivatives of vinyl polymers, excluding cataphoretic paints.

The films 9 and 11 typically have thicknesses comprised between 1 and 200 μm.

To produce the metal sheet 1, the following method may for example be used.

The installation used may comprise a single line or, for example, two different lines to carry out the metal coatings and the painting, respectively. In the event two different lines are used, they may be situated on the same site or different sites. In the rest of the description, an alternative will be considered as an example where two separate lines are used.

In a first line for producing metal coatings 7, a substrate 3 is used that is for example obtained by hot, then cold rolling. The substrate 3 is in the form of a band that is caused to pass through a bath to deposit the coatings 7 by hot dipping.

The bath is a molten zinc bath containing magnesium and aluminum. The bath may also contain up to 0.3 wt % of each of the optional additional elements, such as Si, Sb, Pb, Ti, Ca, Mn, Sn, La, Ce, Cr, Ni, Zr or Bi.

These different elements may make it possible, inter alia, to improve the ductility or adhesion of the coatings 7 on the substrate 3. One skilled in the art who knows their effects on the characteristics of the coatings 7 will know how to use them based on the complementary aim sought. The bath may lastly contain residual elements coming from supply ingots or resulting from the passage of the substrate 3 in the bath, such as iron with a content of up to 5 wt %, and generally comprised between 2 and 4 wt %, for example.

After depositing the coatings 7, the substrate 3 is for example spun dry using nozzles projecting a gas on either side of the substrate 3.

The coatings 7 are then left to cool in a controlled manner.

The band thus treated may next undergo a so-called skin-pass step, which makes it possible to cold work it so as to erase the elasticity plateau, set the mechanical characteristics and give it a roughness suitable for the stamping operations and the painted surface quality one wishes to obtain. The means for adjusting the skin-pass operation is the elongation level, which must be sufficient to achieve the aims and small enough to preserve the subsequent deformation capacity. The elongation level is typically comprised between 0.3 and 3 wt %, and preferably between 0.3 and 2.2%.

The band may optionally be wound before being sent to a pre-lacquering line.

The outer surfaces 15 of the coatings 7 are subjected to the following steps therein:
  degreasing, for example by applying an alkaline solution, then
  rinsing and drying, then
  surface treatment to increase the adherence of the paint and the corrosion resistance, then
  rinsing and optionally drying, then
  painting.

The purpose of the degreasing step is to clean the outer surfaces 15 and therefore remove the traces of organic dirtying, metal particles and dust.

Preferably, this step does not alter the chemical nature of the outer surfaces 15, with the exception of altering any aluminum oxide/hydroxide surface layer. Thus, the solution used for this degreasing step is non-oxidizing. As a result, no magnesium oxide or magnesium hydroxide is formed on the outer surfaces 15 during the degreasing step, and more generally before the painting step.

The surface treatment step comprises applying, on the outer surfaces 15, a conversion solution that reacts chemically with the outer surfaces 15 and thus makes it possible to form conversion layers on the outer surfaces 15. Preferably, the conversion solution does not contain chromium. It may thus be a hexafluorotitanic or hexafluorozirconic acid-based solution.

The painting may for example be done by depositing two successive layers of paint, i.e., a layer of primer and a topcoat layer, which is generally the case to produce the upper film 9, or by depositing a single layer of paint, which is generally the case to produce the lower film 11. Other numbers of layers can be used in certain alternatives.

The layers of paint are for example deposited using roller coaters.

Each deposition of a layer of paint is generally followed by baking in a furnace.

The metal sheet 1 thus obtained can once again be wound before being cut, optionally shaped and assembled with other metal sheets 1 or other elements by users.

The inventors have shown that the use of a step for altering a magnesium oxide or magnesium hydroxide layer present on the outer surface 15 of each coating 7 makes it possible to improve the corrosion resistance of the metal sheet 1, and in particular to limit the bubbling phenomenon of the paint films 9 and 11 when the metal sheet 1 is subjected to a corrosive environment.

A magnesium oxide or magnesium hydroxide layer here refers to a layer that may contain compounds of the $Mg_xO_y$ type, or compounds of the $Mg_x(OH)_y$ type, or a mixture of those two types of compounds.

In fact, XPS (X-ray Photoemission Spectroscopy) spectroscopic analyses of the outer surfaces 15 of the coatings 7 have shown the preponderant presence of magnesium oxide or magnesium hydroxide before painting, even when the coatings 7 have similar aluminum and magnesium content levels.

However, in the typical coatings essentially comprising zinc and aluminum in small proportions, the outer surfaces of the metal coatings are covered with a layer of aluminum oxide, despite the very low aluminum content level. For similar content levels of magnesium and aluminum, it would therefore have been expected to find a preponderant quantity of aluminum oxide.

XPS spectroscopy has also been used to measure the thickness of the layers of magnesium oxide or magnesium hydroxide present on the outer surfaces 15 before painting. It appears that these layers have a thickness of several nm.

It will be noted that these XPS spectroscopic analyses were done on specimens of metal sheets 1 that had not been subjected to corrosive environments. The formation of layers of magnesium oxide or magnesium hydroxide is therefore related to the deposition of the coatings 7.

Figure 2:
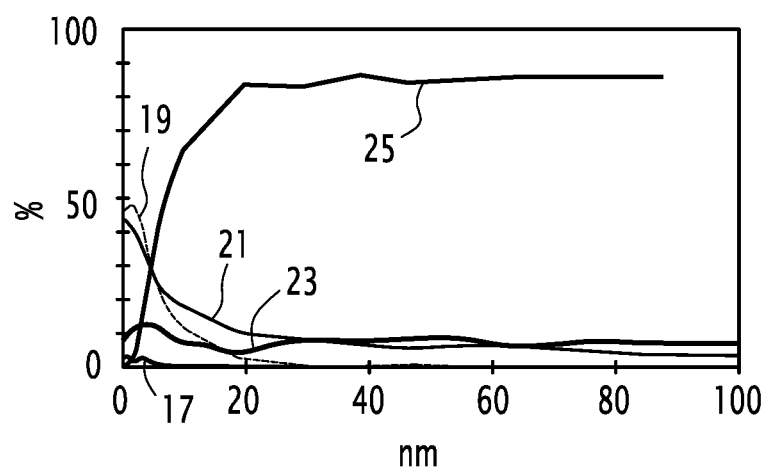
FIGS. 2 and 3 show the results of XPS spectroscopy analysis of the outer surfaces of the metal sheets.
Figure 3:
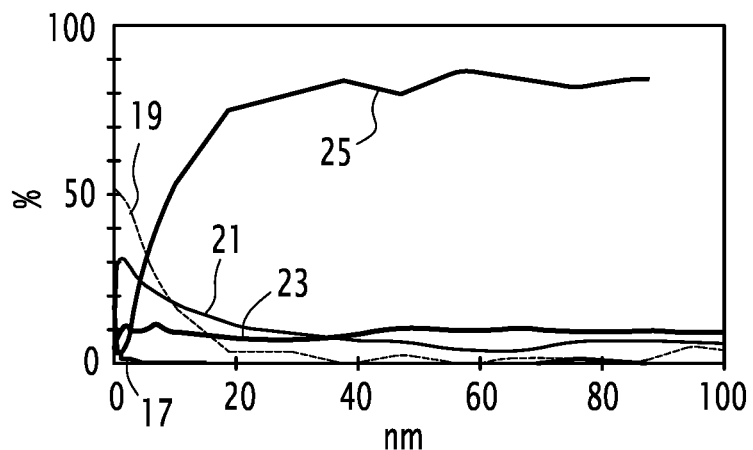

FIGS. 2 and 3 respectively illustrate the spectrums of the elements for energy levels C1s (curve 17), O1s (curve 19), Mg1s (curve 21), Al2p (curve 23) and Zn2p3 (curve 25) during an XPS spectroscopic analysis. The corresponding atomic percentages are shown on the y-axis and the analysis depth on the x-axis.

The sample analyzed in FIG. 2 corresponds to coatings 7 comprising 3.7 wt % of aluminum and 3 wt % of magnesium and subjected to a traditional skin-pass step with an elongation of 0.5%, while the specimen of FIG. 3 has not been subjected to such a step.

On these two specimens, according to the XPS spectroscopic analyses, it may be estimated that the thickness of the layers of magnesium oxide or magnesium hydroxide is approximately 5 nm.

It thus appears that these layers of magnesium oxide or magnesium hydroxide are not removed by the traditional skin-pass steps, or by the traditional alkaline degreasing and traditional surface treatments.

According to the invention, the method for producing the metal sheet 1 comprises, before painting, a step for altering layers of magnesium oxide or magnesium hydroxide present on the outer surfaces 15 of the coatings 7.

Such an alteration step may take place before or during the surface treatment step. It may for example take place on the production line for the coatings 7 or the pre-lacquering line.

In a first embodiment, the alteration step comprises applying an acid solution, for example with a pH comprised between 1 and 4, preferably between 1 and 3.5, and still more preferably between 1 and 3, on the outer surfaces 15. The solution may for example comprise hydrochloric acid, sulfuric acid or phosphoric acid.

The application duration of the acid solution may be comprised between 0.2 s and 30 s, preferably between 0.2 s and 15 s, and still more preferably between 0.5 s and 15 s, as a function of the pH of the solution, and the moment and manner in which it is applied.

The solution may be applied by immersion, aspersion or any other system. The temperature of the solution may for example be the ambient temperature or any other temperature.

In the first embodiment, the step for applying the acid solution takes place after the rinsing and drying step following the degreasing step. The application of the acid solution is followed by a rinsing and optionally drying step of the outer surfaces 15 before the application step for the conversion solution.

In a second embodiment, the step for applying the conversion solution constitutes the alteration step for magnesium oxide or magnesium hydroxide layers present on the outer surfaces 15 of the coatings 7.

In that case, the conversion solution used has a pH comprised between 1 and 2.

The application times are similar to those of the first embodiment.

In a third embodiment, the alteration step comprises the application of mechanical forces, and optionally the application of an acid solution, on the outer surfaces 15 of the metal coatings 7.

Such mechanical forces may be applied by a roller leveler, brushing devices, shot-blasting devices, etc.

These mechanical forces may serve, due to their action alone, to alter the layers of magnesium oxide or magnesium hydroxide. Thus, the brushing and shot-blasting devices may remove all or part of those layers.

Likewise, a roller leveler, which is characterized by the application of a plastic deformation by bending between rollers, may be adjusted to deform the metal sheet that passes through it enough to create cracks in the layers of magnesium oxide or magnesium hydroxide.

In the event the application of mechanical forces is combined with the application of an acid solution, the mechanical forces will preferably be applied before the acid solution or while it is present on the outer surfaces 15 to favor the action of the acid solution.

In that case, the mechanical forces may be less intense. The acid solution may then be applied in the roller leveler.

When an acid solution is used in combination with the application of mechanical forces, the pH of the acid solution may be higher, and in particular greater than 3.

In this third embodiment, the alteration step takes place before the degreasing step.

If the alteration step of the third embodiment comprises applying an acid solution, it is followed by a rinsing and optionally drying step for the outer surfaces 15 of the metal coatings 7.

Specimens of the metal sheets 1 obtained using a method according to the invention, i.e., with a step for altering the layers of magnesium oxide or magnesium hydroxide present on the metal coatings, and metal sheets obtained traditionally, were subjected to corrosion resistance tests. It appears that the metal sheets 1 obtained using a method according to the invention have a better corrosion resistance.

What is claimed is:

1. A method for producing a metal sheet, the method comprising the following steps in this order:
    providing a skin-passed steel substrate having two faces each coated with a metal coating, each metal coating comprising zinc, between 0.1 and 20 wt % of aluminum, and between 0.1 and 10 wt % of magnesium;
    altering layers of magnesium oxide or magnesium hydroxide formed on the outer surfaces of the metal coatings, said altering step comprising applying mechanical forces on the outer surfaces of the metal coatings;
    non-oxidizing degreasing the outer surfaces of the metal coatings;
    rinsing and drying the outer surfaces of the metal coatings;
    applying a conversion solution on the outer surfaces of the metal coatings;
    drying the outer surfaces of the metal coatings;
    painting the outer surfaces of the metal coatings to cover each of them with a paint film comprising at least one polymer chosen from the group consisting of melamine-cross-linking polyesters, isocyanate-cross-linking polyesters, polyurethanes and halogenated derivatives of vinyl polymers, excluding cataphoretic paints wherein the mechanical forces crack the layers of magnesium oxide or magnesium hydroxide.

2. The method according to claim 1, wherein the altering step includes applying an acid solution on the outer surfaces of the metal coatings.

3. The method according to claim 2, further comprising after the step of application of the acid solution and before the non-oxidizing degreasing step a step of rinsing the outer surfaces of the metal coatings.

4. The method according to claim 3, further comprising after the rinsing step and before the non-oxidizing degreasing step a step of drying the outer surfaces of the metal coatings.

5. The method according to claim 2, wherein the mechanical forces are applied on the outer surfaces of the metal coatings before applying the acid solution or when the acid solution is present on the outer surfaces.

6. The method according to claim 5, wherein the mechanical forces are applied by passing through a roller leveler.

7. The method according to claim 1, wherein the metal coatings comprise between 0.3 and 10 wt % of magnesium.

8. The method according to claim 7, wherein the metal coatings comprise between 0.3 and 4 wt % of magnesium.

9. The method according to claim 1, wherein the metal coatings comprise between 0.5 and 11 wt % of aluminum.

10. The method according to claim 9, wherein the metal coatings comprise between 0.7 and 6 wt % of aluminum.

11. The method according to claim 10, wherein the metal coatings comprise between 1 and 6 wt % of aluminum.

12. The method according to claim 1, wherein a weight ratio between the magnesium and the aluminum in the metal coatings is less than or equal to 1.

13. A metal sheet being obtained by the method according to claim 1.

14. The method according to claim 1, wherein the step of providing the skin-passed steel substrate includes hot dipping a steel substrate in a bath to coat the two faces and cooling the coated substrate.

15. The method according to claim 1, wherein the metal coating consists of zinc, between 0.1 and 20 wt % of aluminum, and between 0.1 and 10 wt % of magnesium.

16. The method according to claim 1, wherein the metal coating consists of zinc, between 0.1 and 20 wt % of aluminum, between 0.1 and 10 wt % of magnesium, and up to 0.3 wt % of one or more additional element(s) selected from the group consisting of Sb, Pb, Ti, Ca, Mn, Sn, La, Ce, Cr, Ni, Zr and Bi.

* * * * *